(12) United States Patent
Stewart et al.

(10) Patent No.: US 8,608,963 B2
(45) Date of Patent: Dec. 17, 2013

(54) TWIN TANK WATER TREATMENT SYSTEM AND METHOD

(75) Inventors: John Stewart, Germantown, WI (US); Andrew F. Tischendorf, Campbellsport, WI (US); Kenneth J. Sieth, Delafield, WI (US); Rahul Sadashiv Kamble, Aurangabad (IN)

(73) Assignee: Pentair Residential Filtration, LLC, Minneapolis, MN (US)

( * ) Notice: Subject to any disclaimer, the term of this patent is extended or adjusted under 35 U.S.C. 154(b) by 466 days.

(21) Appl. No.: 12/893,932

(22) Filed: Sep. 29, 2010

(65) Prior Publication Data

US 2011/0089113 A1    Apr. 21, 2011

Related U.S. Application Data

(60) Provisional application No. 61/246,904, filed on Sep. 29, 2009.

(51) Int. Cl.
*B01D 15/00* (2006.01)

(52) U.S. Cl.
USPC ............ 210/264; 210/269; 210/675; 210/676

(58) Field of Classification Search
USPC .................................. 210/264, 269, 675–676
See application file for complete search history.

(56) References Cited

U.S. PATENT DOCUMENTS

| 3,578,167 | A | | 5/1971 | Clack et al. |
| 3,891,552 | A | * | 6/1975 | Prior et al. ....................... 210/88 |
| 3,951,802 | A | | 4/1976 | Derouineau |
| 4,158,628 | A | | 6/1979 | Fleckenstein |
| 4,298,025 | A | * | 11/1981 | Prior et al. ............... 137/624.14 |
| 4,337,153 | A | | 6/1982 | Prior |
| 4,490,249 | A | * | 12/1984 | Seal .................................. 210/89 |
| 4,539,106 | A | | 9/1985 | Schwartz |
| 4,601,808 | A | | 7/1986 | Eumann et al. |
| 4,917,794 | A | | 4/1990 | Fettes et al. |
| 4,987,409 | A | | 1/1991 | Jackson |
| 5,022,994 | A | | 6/1991 | Avery et al. |
| 5,073,255 | A | | 12/1991 | Chili et al. |
| 5,234,601 | A | | 8/1993 | Janke et al. |
| 5,239,285 | A | | 8/1993 | Rak |
| 5,273,070 | A | | 12/1993 | Chili et al. |
| 5,310,488 | A | | 5/1994 | Hansen et al. |
| 5,628,899 | A | | 5/1997 | Vaughan |

(Continued)

FOREIGN PATENT DOCUMENTS

| DE | 3533098 | 3/1987 |
| EP | 1447382 | 8/2004 |

OTHER PUBLICATIONS

International Search Report for PCT/US10/50765, (2010).

*Primary Examiner* — Chester Barry
(74) *Attorney, Agent, or Firm* — Greenberg Traurig LLP

(57) ABSTRACT

Embodiments of the invention provide a twin tank water treatment system and method. The water treatment system includes first tank with a first set of sensors and a first resin bed, a second tank with a second set of sensors and a second resin bed, and a valve assembly with a flow meter and a controller in communication with the first set of sensors, the second set of sensors, and the flow meter. The method includes determining when the resin beds are exhausted based on input from the flow meter, the sensors, and a water hardness setting.

13 Claims, 4 Drawing Sheets

(56) References Cited

U.S. PATENT DOCUMENTS

| | | | |
|---|---|---|---|
| 5,680,055 A | 10/1997 | Seitz et al. | |
| 5,751,598 A * | 5/1998 | Zabinski et al. | 700/266 |
| 6,284,132 B1 | 9/2001 | Zimmerman et al. | |
| 6,696,966 B2 | 2/2004 | Bearak | |
| 6,783,684 B2 | 8/2004 | Teel, Jr. | |
| 6,814,872 B2 | 11/2004 | Rawson | |
| 6,855,257 B2 | 2/2005 | Bonds et al. | |
| 6,863,808 B2 | 3/2005 | Fullmer et al. | |
| 7,285,220 B2 | 10/2007 | Jeong et al. | |
| 7,329,338 B2 | 2/2008 | Sieth et al. | |
| 7,390,413 B2 | 6/2008 | Zentner et al. | |
| 7,563,362 B2 | 7/2009 | Jeong | |
| 2001/0039465 A1 | 11/2001 | Schultz et al. | |
| 2003/0132164 A1* | 7/2003 | FitzGerald et al. | 210/670 |
| 2005/0006311 A1 | 1/2005 | Reif | |
| 2005/0072720 A1 | 4/2005 | Sutera | |
| 2009/0056422 A1 | 3/2009 | Quinn et al. | |
| 2009/0090662 A1 | 4/2009 | Quinn | |

\* cited by examiner

TWIN TANK WATER TREATMENT SYSTEM AND METHOD

RELATED APPLICATIONS

This application claims priority under 35 U.S.C. §119 to U.S. Provisional Patent Application No. 61/246,904 filed on Sep. 29, 2009, the entire contents of which is incorporated, herein by reference.

BACKGROUND

In water softener systems, multiple tanks provide an efficient and reliable means of providing continuous soft water. In single tank systems, a reserve capacity is often configured into the tank controller. The reserve capacity helps to ensure that hard water is not delivered (i.e., to ensure untreated water is not output) during periods of normal water usage until a regeneration can be performed. For example, if regeneration is configured to occur at 2:00 a.m., and non-reserved softening capacity becomes exhausted at 10:00 a.m., the reserve capacity can maintain soft water production until the scheduled regeneration time. Any reserve capacity not exhausted will be regenerated, thereby lowering the efficiency of the system.

SUMMARY

Some embodiments of the invention provide a water treatment system including a first tank with a first set of sensors and a first resin bed, and a second tank with a second set of sensors and a second resin bed. The water treatment system also includes a valve assembly coupled to the first tank and the second tank. The valve assembly includes a controller in communication with the first set of sensors, the second set of sensors, and a flow meter. Also, the controller determines that the first resin bed is exhausted based on input from the flow meter and the first set of sensors, and switches service operation from the first tank to the second tank when the first resin bed is exhausted.

Some embodiments of the invention provide a method for determining resin bed exhaustion of a water treatment system. The method includes measuring a volume of fluid that has flowed through the resin bed, retrieving a water hardness setting and a resin bed capacity, and measuring a hardness front location along the resin bed using at least one sensor. The method also includes calculating a new water hardness setting using the hardness front location, the measured volume of fluid that has flowed through the resin bed, and a placement of the at least one sensor, estimating a remaining fluid volume capacity using the new water hardness setting, the resin bed capacity, and the measured volume of fluid that has flowed through the resin bed, and determining resin bed exhaustion when the remaining fluid volume capacity has flowed through the resin bed.

Some embodiments of the invention provide a water treatment system including a first tank with a first set of sensors and a first resin bed. The water treatment system also includes a valve assembly coupled to the first tank. The valve assembly includes a flow meter and a controller in communication with the first set of sensors and the flow meter. The water treatment system further includes a user interface capable of retrieving an initial water hardness setting. The controller continuously adjusts the initial water hardness setting based on input from the flow meter and the first set of sensors, calculates a remaining volume capacity of fluid flow until the first resin bed is exhausted based on the adjusted water hardness setting, and initiates regeneration of the first resin bed when the remaining volume capacity of fluid flow has been measured by the flow meter.

DETAILED DESCRIPTION

Figure 3:
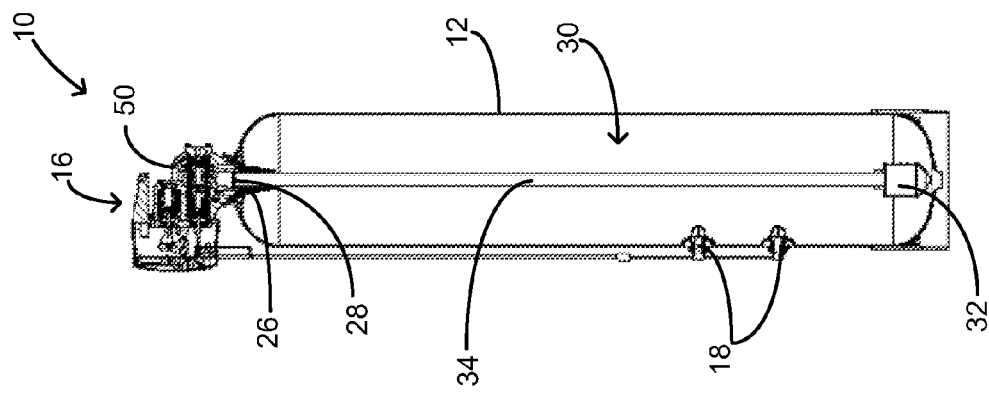
FIG. 3 is a side cross-sectional view of the twin tank water treatment system of FIG. 1.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

The following discussion is presented to enable a person skilled in the art to make and use embodiments of the invention. Various modifications to the illustrated embodiments will be readily apparent to those skilled in the art, and the generic principles herein can be applied to other embodiments and applications without departing from embodiments of the invention. Thus, embodiments of the invention are not intended to be limited to embodiments shown, but are to be accorded the widest scope consistent with the principles and features disclosed herein. The following detailed description is to be read with reference to the figures, in which like elements in different figures have like reference numerals. The figures, which are not necessarily to scale, depict selected embodiments and are not intended to limit the scope of embodiments of the invention. Skilled artisans will recognize the examples provided herein have many useful alternatives and fall within the scope of embodiments of the invention.

Figure 1:
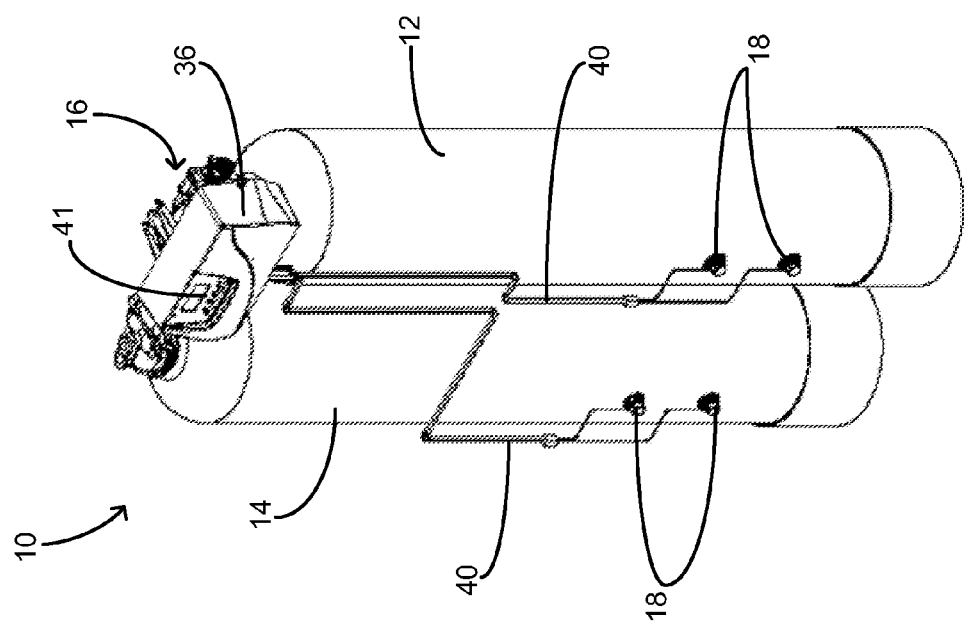
FIG. 1 is a perspective view of a twin tank water treatment system according to one embodiment of the invention.

FIG. 1 illustrates a twin tank water treatment system 10 according to one embodiment of the invention. The system 10 can include a first tank 12, a second tank 14, a valve assembly 16, and sensors 18. In some embodiments, the system 10 can be used for substantially continuous residential or commercial water softening.

Figure 2:
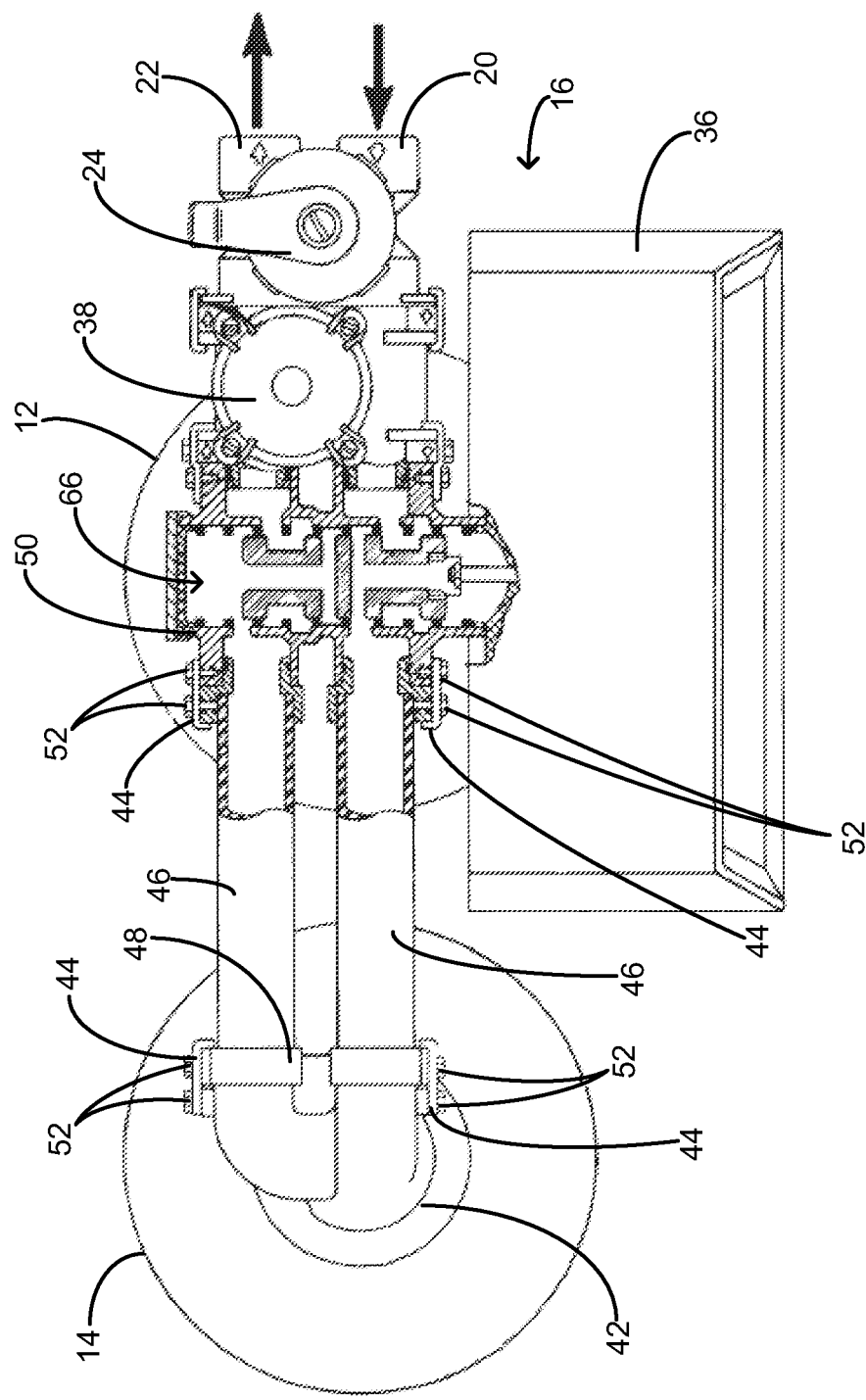
FIG. 2 is a top view of the twin tank water treatment system of FIG. 1.

As shown in FIG. 2, the valve assembly 16 can include a system inlet 20 for receiving untreated fluid (e.g., "hard" water) and a system outlet 22 for supplying treated fluid (e.g., "soft" water). In some embodiments, the valve assembly 16 can include a bypass valve 24 which, when actuated, can allow fluid received at the system inlet 20 to bypass the system 10 and flow straight to the system outlet 22. As a result, the bypass valve 24 can allow the system outlet 22 to supply untreated fluid if necessary, for example, during maintenance of the system 10. When the bypass valve 24 is not actuated, the valve assembly 16 can direct the flow of untreated fluid from the system inlet 20 to a tank inlet 26 (as shown in FIG. 3) of either the first tank 12 or the second tank 14 for treatment. The valve assembly 16 can then receive treated fluid from a tank outlet 28 of either the first tank 12 or the second tank 14 and direct the treated fluid to the system outlet 22.

In some embodiments, the valve assembly 16 can control which tank 12, 14 is in service and can control a regeneration process of the tank 14, 12 that is not in service. For example, the valve assembly 16 can allow the first tank 12 to be in service for treating fluid while the second tank 14 is out of service, and once the in-service first tank 12 has been exhausted and requires regeneration, the valve assembly 16 can switch fluid flow to the second tank 14 for fluid treatment and control regeneration of the first tank 12. As a result, fluid treatment can be substantially continuous, without requiring down-time like conventional single-tank systems.

The valve assembly 16 can also control regeneration stages of both the first tank 12 and the second tank 14. For example, each tank 12, 14 can include a resin bed 30 (as shown in FIG. 3.) saturated with mono-positive ions, such as sodium ions. The mono-positive ions can bind to resin beads of the resin bed at binding sites. During treatment, untreated fluid can flow from the tank inlet 26 through the resin bed 30 and di-positive and/or tri-positive (e.g., calcium ions, magnesium ions, iron ions, aluminum ions, etc., hereinafter "hardness ions") in the untreated fluid can replace the mono-positive ions at the binding sites of the resin beads. The treated fluid (i.e., the fluid substantially free of the hardness ions) can then be supplied through the tank outlet 28. More specifically, as shown in FIG. 3, untreated water can be supplied through the tank inlet 26 near a top portion of the tank 12, 14, flow downward through the resin bed 30 to a bottom portion of the tank 12, 14, through a collector cup 32 into a distributor tube 34, and back up to the tank outlet 28 through the distributor tube 34.

When the untreated water reaches the resin bed 30, hardness ions can bind to the first available binding sites. As a result, the top portion of resin bed 30 can be exhausted first. More specifically, an interface, or hardness front, between exhausted and unexhausted resin can begin at the top portion of the resin bed 30 and move downward through the resin bed 30 over time. Once the mono-positive ions from substantially all binding sites have been replaced with hardness ions (i.e., once the hardness front has reached or nearly reached the bottom of the tank 12, 14), the resin bed 30 can be considered exhausted and can require regeneration with, for example, a brine solution to re-saturate the resin bed 30 with mono-positive ions. In some embodiments, the valve assembly 16 can include a controller 36 in communication with the sensors 18 and at least one flow meter 38 (as shown in FIG. 2) to determine when the resin bed 30 of the tank 12, 14 is exhausted, as described below. As shown in FIG. 2, the valve assembly 16 can include the flow meter 38 to measure a volume of fluid flow through the system outlet 22. In some embodiments, the flow meter 38 can measure a volume of fluid flow through the system inlet 20, one of the tank inlets 26, and/or one of the tank outlets 28.

As shown in FIGS. 1 and 2, each tank 12, 14 can include two sensors 18. In some embodiments, the sensors 18 can be conductivity probes and can extend into the tank 12, 14 vertically displaced from one another. The conductivity of the resin bed 30 can be dependent on the ions occupying the binding sites. As a result, the conductivity measured by each of the sensors 18 can be higher when the binding sites contain mono-positive sodium ions and lower when the binding sites contain di-positive or tri-positive hardness ions, resulting in a different conductivity on each side of the hardness front. Due to varying water supplies, the conductivity of the fluid supplied to the system 10 may not be uniform. The controller 36 can use the ratio of two conductivity measurements (i.e., from the two sensors 18), as described below, to determine a location of the hardness front. By using a ratio, the conductivity of the fluid can become a common mode signal so that the resulting ratio is dependent on the conductivity of the sodium ions and/or the conductivity of the hardness ions in the resin bed 30.

Conductivity is also strongly influenced by temperature. Temperature compensation can be a multiplying factor. The conductivity ratio can be independent of temperature when the sensors 18 are at the same temperature. The sensors 18 can be at a different temperature when there is fluid flow until the resin bed 30 reaches thermal equilibrium. Since the time to reach thermal equilibrium can be substantially shorter than the movement of the hardness front, a digital low pass filter can be applied to the ratio to help remove temperature effects. In some embodiments, the type of resin in the resin bed 30 can also be a factor which affects the ratio and can be taken into consideration when the controller 36 determines the ratio.

Conductivity is also influenced by a "cell constant" of each sensor 18. The cell constant can be the ratio of an effective length of a conducting path the two electrodes of each sensor 18 and a cross sectional area between the two electrodes of each sensor 18. The cell constant is also controlled by the geometry of the electrodes. In one embodiment, the ratio measured by the two sensors 18 can be independent of the cell constants if both sensors 18 have the same cell constants. If the cell constants of the two sensor 18 are not the same, the ratio of the cell constants can be calculated when the ratio of the conductivities is known. For example, as explained below, the conductivity ratio can be known after regeneration and after a complete service cycle. When the ratio of the cell constants is known, it can be used to correct the calculated conductivity ratio.

After regeneration, the ratio can be about 1.0 since both sensors 18 are exposed to approximately the same concentration of sodium ions. As hardness ions replace the sodium ions, the resin bed 30 can progressively become less conductive starting at the top portion and working toward the bottom portion. This causes the ratio of the bottom sensor 18 conductance relative to the top sensor 18 conductance to increase, indicating a "leading edge" in the ratio. For example, the ratio can be between about 1.8 and about 2.4 when the hardness front is between the sensors 18. A maximum value of the ratio can be a function of the ratio of conductance of sodium and hardness ions.

When the hardness front passes the bottom sensor 18, the ratio can again approach about 1.0, indicating a "trailing edge" of the ratio, because both sensors 18 are exposed to approximately the same concentration of hardness ions. As a result, there may be no difference between the regenerated ratio and the exhausted ratio and only when the hardness front is between the sensors 18 may the ratio differ from about 1.0.

In some embodiments, the controller 36 can include a microcontroller or a microprocessor (not shown) which can execute algorithms for calculating the ratio using measurements sensed by the sensors 18 and retrieved by the controller 36.

After regeneration, the controller 36 can be in a leading edge state until the leading edge occurs. The controller 36 can calculate the probability of a leading edge hardness front, P[le], and more specifically, when the leading edge occurs, using the following equation:

$$P[le] = \frac{MaximumCurrentRatio}{3 \times MinimumCurrentRatio} \quad \begin{array}{l} \text{if } P[le] > 1 \text{ then } P[le] = 1 \\ \text{if } P[le] < 0.35 \text{ then } P[le] = 0 \end{array}$$

In one embodiment, while in the leading edge state, the controller 36 can use a present, calculated ratio rather than a maximum ratio. In addition, in some embodiments, the controller 36 can use an average of ratios calculated since the last regeneration occurred rather than the minimum ratio. This can allow the controller 36 to ignore decreased signals that may be present after regeneration. The controller 36 can switch from the leading edge state to a trailing edge state when P[le] is non-zero. In other words, the controller 36 can determine that the leading edge occurs when P[le] changes from zero to one. Once the leading edge has occurred, the controller 36 can switch from a leading edge state to a trailing edge state in order to determine when the trailing edge occurs.

The controller 36 can calculate the probability of a trailing edge hardness front, P[te], and more specifically, when the trailing edge occurs, using the following equation:

$$P[te] = \frac{MaximumCurrentRatio - PresentCurrentRatio}{MaximumCurrentRatio - MinimumCurrentRatio}$$

The controller 36 can also calculate P[le] when in the trailing edge state. The controller can then use P[le] and P[te] to determine or detect impending exhaustion of the resin bed 30. For example, in one embodiment, the controller 36 can detect complete exhaustion when the product of P[le] and P[te] is greater than, for example, about 0.38 for four consecutive hours. In some embodiments, while checking for exhaustion, if P[le] is less than 0.45, P[le] can be set to 0.0. In another embodiment, the controller 36 can detect impending exhaustion of the resin bed 30 once the hardness front passes the lowermost sensor 18 (i.e., once the trailing edge is triggered) and calculate when the resin bed 30 will be completely exhausted, as described below.

In some embodiments, the controller 36 can retrieve conductivity measurements from the sensors 18 to calculate the ratios, for example, through external connections 40, as shown in FIGS. 1 and 3. In one embodiment, the algorithms described below can be used by the controller 36.

Using two digital output lines, the controller 36 can generate an eight level Walsh approximation to a sine wave. This signal can be applied to a Walsh sine wave generator to combine the terms at correct ratios. The output of the Walsh sine wave generator can be applied to a low pass filter in order to remove high order harmonics, resulting in an essentially pure sine wave. The output of the low pass filter can pass though a resistor to drive the electrodes of the sensors 18. The resistor can increase the range of a conductivity signal, because the voltage applied to the sensors 18 decreases as the current increases. For any non-zero generator voltage, the ratio of the conductivities can be independent of the generator voltage.

The sensors 18 can be excited with the sine wave. In one embodiment, the sine wave can have a frequency of approximately 1,000 Hertz with a peak amplitude of approximately 100 millivolts. This low excitation voltage can help prevent chemical reduction from occurring at the electrodes of the sensors 18. Also, the relatively high excitation frequency can help reduce the possible effects of electrode double layer capacitance.

Current from each sensor 18 can be applied to individual current-to-voltage converters. The current-to-voltage converters can transform the current through the sensors 18 into a voltage. In one embodiment, the current-to-voltage converters can have a low pass filter that attenuates frequencies above the Nyquist frequency. The low pass filtered voltages can then be applied to an A/D input of the controller 36. The controller 36 can alternately read eight samples of one cycle for each sensor input. A Fourier transform can adaptively filter and calculate the magnitude of the currents using, for example, 4000 cycles of each current. After calculating the Fourier sums for the 4000 cycles, the controller 36 can calculate the ratio and apply the ratio to another low pass filter. In one embodiment, the controller 36 can calculate the low pass filtered ratio once every minute.

In some embodiments, the controller 36 can use adaptive algorithms to follow the exhaustion front through the resin bed 30. These algorithms can compensate for changes measured by the sensors 18 caused, for example, by unequal contamination of the untreated water. For example, untreated water can include a hardness setting (e.g., in kilo-grains/gallon of water) depending on concentrations of hardness ions in the untreated water. Untreated water from different sources or from the same source can include varied actual hardness settings due to unequal contamination, or unequal concentrations of hardness ions.

In some embodiments, the controller 36 can determine a location of the hardness front and a volume of fluid treated until the hardness front has reached the determined location, and the controller 36 can adjust a hardness setting of the fluid based on these determinations. As a result, a more accurate hardness setting can be used to estimate the volume capacity available before the resin bed 30 is completely exhausted.

In one embodiment, the controller 36 can use an estimated initial hardness setting, for example, as input by a user, and can adjust the hardness setting based on measurements from the sensors 18 and the flow meter 38. In one embodiment, when the controller 36 detects impending resin bed exhaustion (i.e., when the controller 36 detects the trailing edge), it can automatically adjust a new hardness setting using the following formulas in order to compensate for the varied actual hardness settings of the untreated water:

Adjust Ratio=((100−Sensor Placement)×(capacity)× 1000)/((fluid volume used since last regeneration)×(Current Hardness))

New Hardness=Old Hardness×Adjust Ratio

More specifically, an "adjust ratio" can be calculated based on a known capacity of the resin bed (e.g., in grains, as input by the user), placement of the lowermost sensor 18 (e.g., as a unit-less number input by the user), the measured volume of fluid which has been treated since the last regeneration (e.g., in gallons, as measured by the flow meter 38), and the old hardness setting (e.g., in kilo-grains/gallon, either as input by the user or as previously calculated by the controller 36). The new hardness setting can be a product of the old hardness setting and the adjust ratio. In some embodiments, the adjust ratio can be limited to about +/−20%. In some embodiments, the user can input the information, such as capacity of the resin bed, placement of the sensor 18, an initial hardness setting, or other information using a user interface 41 of the controller 36, as shown in FIG. 1.

By using measurements from the sensors 18 as well as measurements from the flow meter 38 as described above to adjust the hardness setting during each cycle, a point of complete resin bed exhaustion can be more accurately measured. For example, using the new hardness setting and the known capacity of the resin, a total volume capacity of the resin bed 30 can be calculated. The measured volume of fluid which has been treated since the last regeneration can be subtracted from the total volume capacity to determine a remaining volume capacity available before the resin bed 30 is completely exhausted (i.e., for the hardness front to move from the lowermost sensor 18 down to the bottom portion of the resin bed 30). As a result, substantially the entire resin bed 30 can be completely utilized, maximizing an efficiency of the system 10. For example, conventional systems without conductivity sensors typically require a reserve capacity. Such systems may only use a flow sensor to determine when regeneration should occur (i.e., after a certain volume of fluid has been treated). Since a flow sensor cannot determine where the hardness front is located along the resin bed, most conventional systems must be configured with the reserve capacity (or safety capacity) to ensure that a regeneration occurs before hard water is delivered. In some embodiments of the invention, the reserve capacity may no longer be required in the system 10 because an estimated volume capacity of fluid that can be treated before the resin bed 30 is fully exhausted can be more accurately measured during the service cycle, and the second tank 14 can provide an immediate source of fluid to treat whenever the first tank requires regeneration.

The controller 36 can use an adaptive algorithm to follow the hardness front through the resin bed. The controller can also include physical memory, such as electronic erasable programmable read-only memory (EEPROM), flash memory, etc. in order to store measurement values, past ratio calculations, and other data. For example, historical information regarding minimum ratios and maximum ratios during previous service cycles can be stored in the memory. This information can be used after a power outage to estimate a location of the hardness front.

Figure 4:
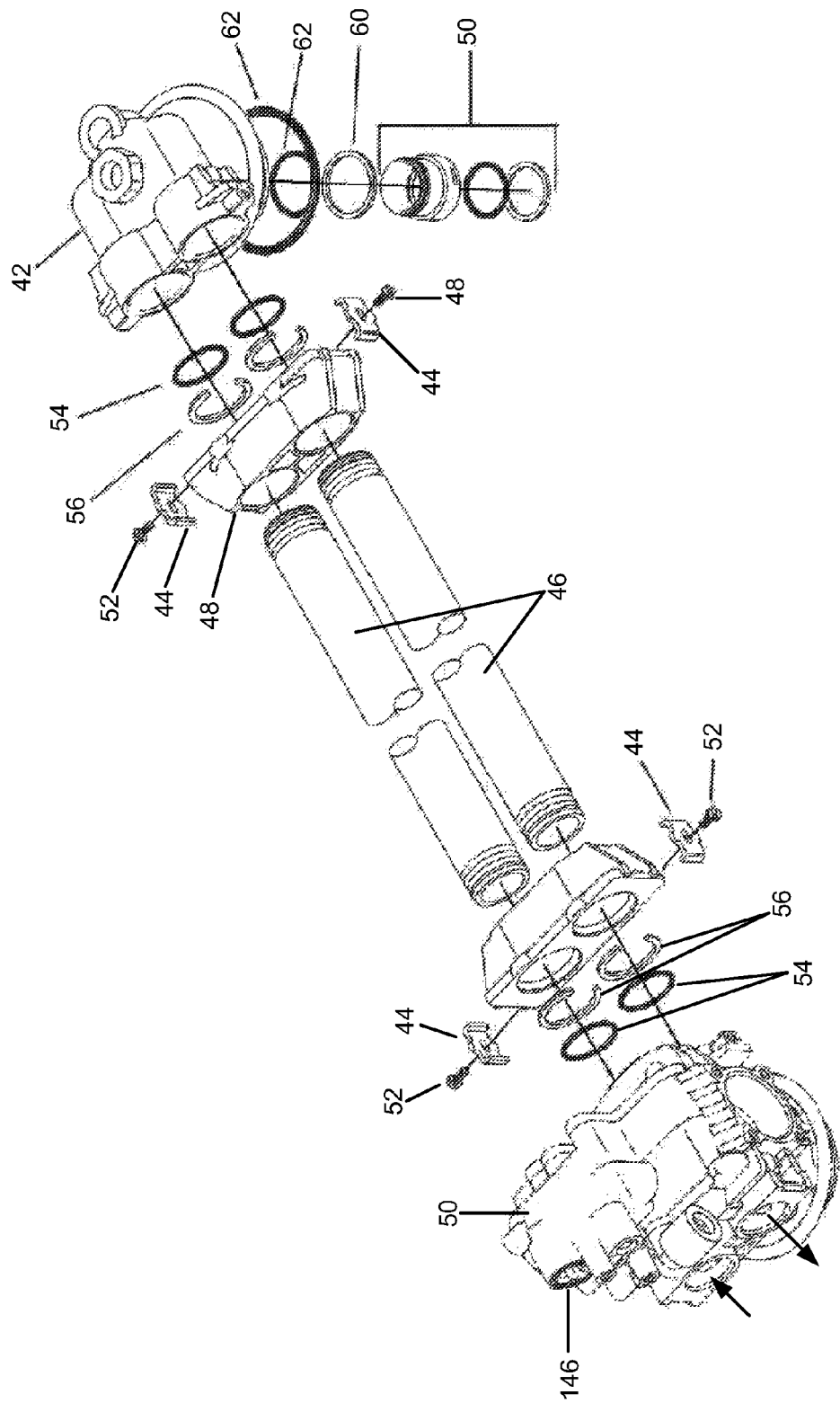
FIG. 4 is an exploded perspective view of a portion of a valve assembly of the twin tank water treatment system of FIG. 1.

In some embodiments, the valve assembly 16 can be capable of controlling which tank 12, 14 is in service and the regeneration process of the tank 12, 14 that is not in service. As shown in FIGS. 2 and 4, the system 10 can include a second tank adapter 42, adapter clips 44, yokes 46, and yoke mounts 48 to couple the second tank 14 to a valve body 50 of the valve assembly 16. The adapter clips 44 can couple the yokes mounts 48 to the valve body 50 and the second tank adapter 42, as shown in FIG. 4, via fasteners 52, such a screws. O-rings 54 and retainer rings 56 can also be used as seals at the connection points between the yokes mounts 48 and the valve body 50, as well as the yoke mounts 48 and the second tank adapter 42. As shown in FIG. 4, the second tank adapter 42 can also include a distributor adapter kit 58, a distributor retainer ring 60, and o-rings 62 in order to substantially seal a connection between the second tank adapter 42 and the second tank 14. In addition, as shown in FIG. 5, the valve body 50 can be coupled to the first tank 12 by a distributor adapter 96 and a retainer ring 98.

Figure 5:
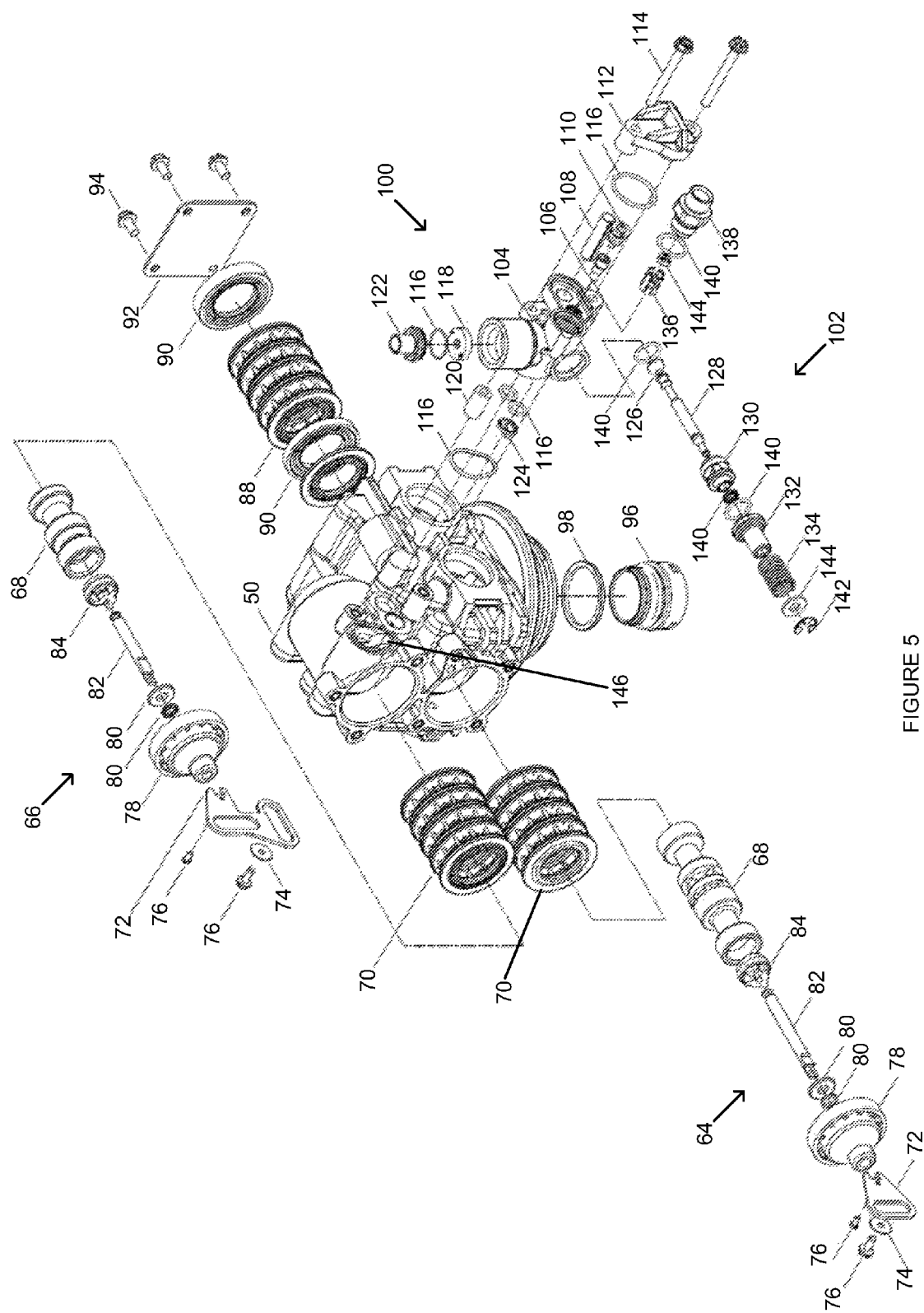
FIG. 5 is an exploded perspective view of another portion of the valve assembly of the twin tank water treatment system of FIG. 1.

FIG. 5 illustrates a portion of the valve assembly 16 according to one embodiment of the invention. As shown in FIG. 5, the valve assembly 16 can include a first piston assembly 64 and a second piston assembly 66 to control fluid distribution in the first tank 12 and the second tank 14, respectively. For example, the controller 36 can control a position of a piston 68 within a spacer assembly 70 to provide proper fluid movement for a service cycle or for different stages of the regeneration cycle (e.g., backwash, brine draw, rinse, brine fill etc.). In one embodiment, the valve assembly 16 can include a timer assembly and/or an optical encoder (not shown) to move a piston rod link 72 and control a position of the piston 68 in the spacer assembly 70. The controller 36 can also monitor piston positions within the spacer assembly 70 to monitor the stages of the regeneration cycle. The single controller 36 designed to interface with the sensors 18, the flow meter 38, and both the piston assemblies 64, 66 can offer a low complexity, high efficiency system 10. In addition, as shown in FIG. 5, each piston assembly 64, 66 can include washers 74, screws 76, an end plug 78, seals 80, a piston rod 82, and a piston rod retainer 84. The valve assembly 16 can control the flow of fluid to either the first tank 14 or the second tank 16 with a switch valve assembly 86 including a spacer assembly 88 and end plugs 90, as shown in FIG. 5. The switch valve assembly 86 can be enclosed in the valve body 50 by an end plate 92 and screws 94.

In some embodiments, the valve assembly 16 can use an injector assembly 100 and a brine valve assembly 102, as shown in FIG. 5, during stages of regeneration. The injector assembly 100 can include an injector body 104, an injector throat 106, an injector screen 108, an injector nozzle 110, an injector cap 112, screws 114, o-rings 116, washers 118, spacers 120, a drain line flow control retainer button 122, and an air disperser 124. The brine valve assembly 102 can include a brine valve seat 126, a brine valve stem 128, a brine valve spacer 130, a brine valve cap 132, a brine valve spring 134, a brine line flow control retainer 136, a brine line flow control adapter 138, o-rings 140, retainer rings 142, and washers 144. In one embodiment, the injector assembly 100 can be in fluid communication with a drain portion 146 of the valve assembly 16 and the brine valve assembly 102 can be coupled to the injector body 104.

In some embodiments, the controller 36 can also be used to determine faults or failures in the system 10. During regeneration, the controller 36 can measure a maximum value and a minimum value of the resistive (or real) part of the current of the one of the sensors 18. At the end of regeneration, the controller 36 can calculate the probability that salt was present, P[salt], using the following equation:

$$P[\text{salt}] = \left| \frac{MaximumRealCurrentDuringRegeneration}{3 \times MinimumRealCurrentDuringRegeneration} \right|$$

if $P[\text{salt}] > 1$ then $P[\text{salt}] = 1$

If P[salt] is less then 0.43 the controller 36 can set a "No Salt" flag to indicate no or minimal salt was present during regeneration (i.e., from the brine solution). If P[salt] is not less then 0.43, the controller can clear the No Salt flag.

In some embodiments, when the controller 36 detects impending exhaustion (i.e., when the trailing edge is triggered), the controller 36 can calculate the running average of P[le] for the last four service cycles. The controller 36 can then compare this average to P[le] of the present service cycle. If P[le] of the present service cycle is less than a percentage (e.g., about 22.5%) of the average, a "Reduced Capacity" flag can be set to indicate reduced capacity of the resin bed 30. The controller 36 can also set the Reduced Capacity flag if P[le] for the present service cycle is less than a value (e.g., about 0.55). If P[le] is not less than a percentage of the average and is greater than the value, the controller 36 can clear the Reduced Capacity flag.

In some embodiments, the controller 36 can also determine if the current ratio is within a range (e.g., about 0.111 to about 100). If the ratio is outside this range, a "Bad Probe" flag can be set, indicating a failure or issue with one of the sensors 18. The Bad Probe flag can be cleared when the ratio is within the range.

It will be appreciated by those skilled in the art that while the invention has been described above in connection with particular embodiments and examples, the invention is not necessarily so limited, and that numerous other embodiments, examples, uses, modifications and departures from the embodiments, examples and uses are intended to be encompassed by the claims attached hereto. The entire disclosure of each patent and publication cited herein is incorporated by reference, as if each such patent or publication were individually incorporated by reference herein. Various features and advantages of the invention are set forth in the following claims.

The invention claimed is:

1. A water treatment system comprising:
   a first tank including a first set of sensors and a first resin bed;
   a second tank including a second set of sensors and a second resin bed; and
   a valve assembly coupled to the first tank and the second tank and including a controller in communication with the first set of sensors, the second set of sensors, and a flow meter,
   the first set of sensors positioned partially through the first tank coupled to the first resin bed and to the controller by external connections coupled to the first set of sensors outside of the first tank,
   the second set of sensors positioned partially through the second tank coupled to the second resin bed and to the controller by external connections coupled to the second set of sensors outside of the second tank,
   the controller configured and arranged to determine whether the first resin bed is exhausted based on input from the flow meter and the first set of sensors,
   the controller configured and arranged to switch service operation from the first tank to the second tank when the first resin bed is exhausted.

2. The water treatment system of claim 1, wherein the controller is configured and arranged to determine a hardness front location along the first resin bed using the first set of sensors, measure a volume of fluid that has flowed through the first resin bed using the flow meter, and obtain a position of the lowermost sensor of the first set of sensors.

3. The water treatment system of claim 2, wherein the controller is configured and arranged to calculate a water hardness setting using the hardness front location, the measured volume of fluid that has flowed through the resin bed, and the position of the lowermost sensor of the first set of sensors, estimate a remaining fluid volume capacity using the water hardness setting, a resin bed capacity, and the measured volume of fluid that has flowed through the resin bed, and determine that the first resin bed is exhausted when the remaining fluid volume capacity has flowed through the first resin bed.

4. The water treatment system of claim 1, wherein the controller is configured and arranged to determine that the second resin bed is exhausted based on input from the flow meter and the second set of sensors, and switch service operation from the second tank to the first tank when the second resin bed is exhausted.

5. The water treatment system of claim 1, wherein the valve assembly includes a first piston valve assembly for controlling fluid flow into the first tank, and the controller is configured and arranged to control the first piston valve assembly to perform regeneration of the first resin bed when the first resin bed is exhausted.

6. The water treatment system of claim 1, wherein the valve assembly includes a switching valve assembly and the controller is configured and arranged to control the switching valve assembly to switch service operation from the first tank to the second tank when the first resin bed is exhausted.

7. The water treatment system of claim 1, wherein the controller is configured and arranged to determine whether the first resin bed is exhausted when substantially zero reserve capacity is left within the first resin bed.

8. The water treatment system of claim 1, and further comprising a user interface, wherein the controller is configured and arranged to determine that the first resin bed is exhausted based on input from the flow meter, the first set of sensors, and the user interface.

9. The water treatment system of claim 1, and further comprising a system inlet and a system outlet, wherein the flow meter is coupled to the valve assembly at the system outlet.

10. A water treatment system comprising:
    a first tank including a first set of sensors and a first resin bed,
    the first set of sensors positioned partially through the first tank coupled to the first resin bed;
    a valve assembly coupled to the first tank, the valve assembly including a flow meter and a controller,
    the controller in communication with the first set of sensors by external connections coupled to the first set of sensors outside of the first tank, and the flow meter; and
    a user interface capable of retrieving an initial water hardness setting,
    the controller configured and arranged to substantially continuously adjust the initial water hardness setting based on input from the flow meter and the first set of sensors, and calculate a remaining volume capacity of fluid flow until the first resin bed is exhausted based on an adjusted water hardness setting, and initiate regeneration of the first resin bed when the remaining volume capacity of fluid flow has been exceeded as measured by the flow meter.

11. The water treatment system of claim 10, and further comprising second tank including a second set of sensors and a second resin bed,
    the second set of sensors positioned partially through the second tank coupled to the second resin bed and to the controller by external connections coupled to the second set of sensors outside of the second tank; and
    wherein the controller is configured and arranged to switch service from the first tank to the second tank when regeneration of the first resin bed is initiated.

12. The water treatment system of claim 11, wherein the controller is configured and arranged to continuously adjust the initial water hardness setting based on input from the flow meter and the second set of sensors, and calculate a remaining volume capacity of fluid flow until the second resin bed is exhausted based on the adjusted water hardness setting, and initiate regeneration of the second resin bed when the remaining volume capacity of fluid flow has been measured by the flow meter.

13. The water treatment system of claim 11, wherein the valve assembly includes a switching valve assembly controlled by the controller and capable of switching service from one of the first tank to the second tank and the second tank to the first tank.

* * * * *